United States Patent
Griffith

(10) Patent No.: US 12,002,372 B2
(45) Date of Patent: *Jun. 4, 2024

(54) SENSOR ASSEMBLY FOR USE IN ASSOCIATION WITH AIRCRAFT COLLISION AVOIDANCE SYSTEM AND METHOD OF USING THE SAME

(71) Applicant: Gregory M. Griffith, Holland, MI (US)

(72) Inventor: Gregory M. Griffith, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,637

(22) Filed: Jun. 20, 2023

(65) Prior Publication Data

US 2024/0046806 A1   Feb. 8, 2024

Related U.S. Application Data

(63) Continuation of application No. 17/204,304, filed on Mar. 17, 2021, now Pat. No. 11,682,313.

(51) Int. Cl.
| | |
|---|---|
| *G08G 5/04* | (2006.01) |
| *G01S 17/933* | (2020.01) |
| *G08G 5/00* | (2006.01) |
| *B25J 9/16* | (2006.01) |
| *B60R 21/015* | (2006.01) |
| *G01S 13/86* | (2006.01) |
| *G08G 1/16* | (2006.01) |

(52) U.S. Cl.
CPC .............. *G08G 5/04* (2013.01); *G01S 17/933* (2013.01); *G08G 5/006* (2013.01); *B25J 9/1666* (2013.01); *B60R 21/01536* (2014.10); *G01S 13/867* (2013.01); *G08G 1/16* (2013.01)

(58) Field of Classification Search
CPC ............................ G08G 5/04; B60R 21/01536
USPC ....................................................... 701/3, 46
See application file for complete search history.

(56) References Cited

U.S. PATENT DOCUMENTS

| | | | |
|---|---|---|---|
| 1,648,463 | A | 11/1927 | Rohrbach |
| 2,934,755 | A | 4/1960 | Canada |
| 2,938,192 | A | 5/1960 | Adler, Jr. |
| 3,053,932 | A | 9/1962 | Worst |
| 3,149,196 | A | 9/1964 | Roth |
| 3,235,838 | A | 2/1966 | Hilt |
| 3,455,272 | A | 7/1969 | Zelle |
| 3,579,238 | A | 5/1971 | Haeff et al. |

(Continued)

FOREIGN PATENT DOCUMENTS

| | | | | |
|---|---|---|---|---|
| CA | 3083132 A1 | * | 6/2019 | .......... B25J 15/0408 |
| CA | 3091672 A1 | * | 8/2019 | ............ B25J 9/1679 |

(Continued)

OTHER PUBLICATIONS

Choi, Byungjoo, et al. "Experimental and Analytical Characterization of Drop Impact Behavior for a Mobile Haptic Actuator.". (Year: 2017).*

(Continued)

*Primary Examiner* — Cuong H Nguyen
(74) *Attorney, Agent, or Firm* — King & Partners, PLC

(57) ABSTRACT

A sensor assembly for use in association with non-integrated, ground-based collision avoidance systems for aircraft, including (a) a sensor; and (b) a frame sub-assembly, wherein the sensor is releasably securable to the frame sub-assembly.

13 Claims, 4 Drawing Sheets

(56) References Cited

U.S. PATENT DOCUMENTS

| | | |
|---|---|---|
| 3,690,767 A | 9/1972 | Missio et al. |
| 3,710,311 A | 1/1973 | Avital |
| 3,733,604 A | 5/1973 | Smith |
| 3,739,379 A | 6/1973 | Davis |
| 3,765,770 A | 10/1973 | McConnell et al. |
| 3,803,614 A | 4/1974 | Reid |
| 3,872,474 A | 3/1975 | Levine |
| 3,985,030 A | 10/1976 | Charlton |
| 4,001,499 A | 1/1977 | Dowell |
| 4,044,354 A | 8/1977 | Bosher et al. |
| 4,066,890 A | 1/1978 | Hamilton et al. |
| 4,071,843 A | 1/1978 | Marien |
| 4,115,841 A | 9/1978 | Alexander |
| 4,139,848 A | 2/1979 | Maxwell et al. |
| 4,152,693 A | 5/1979 | Ashworth, Jr. |
| 4,225,866 A | 9/1980 | Levine |
| 4,233,652 A | 11/1980 | Oswald |
| 4,277,170 A | 7/1981 | Miles |
| 4,319,246 A | 3/1982 | Fitz |
| 4,322,726 A | 3/1982 | Collier et al. |
| 4,336,538 A | 6/1982 | Radford |
| 4,355,348 A | 10/1982 | Williams |
| 4,367,514 A | 1/1983 | Large et al. |
| 4,405,205 A | 9/1983 | Rossmann |
| 4,445,132 A | 4/1984 | Ichikawa et al. |
| 4,445,185 A | 4/1984 | Davis, Jr. et al. |
| 4,465,367 A | 8/1984 | Sabatier |
| 4,495,549 A | 1/1985 | Carlson et al. |
| 4,527,158 A | 7/1985 | Runnels |
| 4,528,564 A | 7/1985 | Trampnau |
| 4,531,408 A | 7/1985 | Chadwick et al. |
| 4,552,376 A | 11/1985 | Cofer |
| 4,581,762 A | 4/1986 | Lapidus et al. |
| 4,602,336 A | 7/1986 | Brown |
| 4,633,376 A | 12/1986 | Newman |
| 4,635,203 A | 1/1987 | Merchant |
| 4,678,329 A | 7/1987 | Lukowski, Jr. et al. |
| 4,684,247 A | 8/1987 | Hammill, III |
| 4,688,046 A | 8/1987 | Schwab |
| 4,695,013 A | 9/1987 | Trampnau |
| 4,695,959 A | 9/1987 | Lees et al. |
| 4,713,669 A | 12/1987 | Shuch |
| 4,727,311 A | 2/1988 | Walker |
| 4,731,663 A | 3/1988 | Kovalchick et al. |
| 4,758,839 A | 7/1988 | Goebel et al. |
| 4,779,095 A | 10/1988 | Guerreri |
| 4,792,904 A | 12/1988 | Reinagel et al. |
| 4,799,267 A | 1/1989 | Kamejima et al. |
| 4,805,015 A | 2/1989 | Copeland |
| 4,805,453 A | 2/1989 | Haynes |
| 4,816,828 A | 3/1989 | Feher |
| 4,916,445 A | 4/1990 | Crossley |
| 4,918,442 A | 4/1990 | Bogart, Jr. |
| 5,030,946 A | 7/1991 | Yamamura |
| 5,063,462 A | 11/1991 | Nakagawa et al. |
| 5,184,114 A | 2/1993 | Brown |
| 5,225,819 A | 7/1993 | Hosotani et al. |
| 5,233,337 A | 8/1993 | Takahashi |
| 5,285,205 A | 2/1994 | White |
| 5,296,854 A | 3/1994 | Hamilton et al. |
| 5,315,296 A | 5/1994 | Kaiser et al. |
| 5,343,295 A | 8/1994 | Lara et al. |
| 5,406,395 A | 4/1995 | Wilson et al. |
| 5,410,328 A | 4/1995 | Yoksza et al. |
| 5,420,482 A | 5/1995 | Phares |
| 5,436,535 A | 7/1995 | Yang |
| 5,508,721 A | 4/1996 | Hattori |
| 5,581,250 A | 12/1996 | Khvilivitzky |
| 5,601,353 A | 2/1997 | Naimark et al. |
| 5,621,282 A | 4/1997 | Haskell |
| 5,646,783 A | 7/1997 | Banbury |
| 5,647,016 A | 7/1997 | Takeyama |
| 5,712,650 A | 1/1998 | Barlow |
| 5,717,392 A | 2/1998 | Eldridge |
| 5,719,568 A | 2/1998 | Adams |
| 5,734,336 A | 3/1998 | Smithline |
| 5,734,361 A | 3/1998 | Suzuki et al. |
| 5,780,321 A | 7/1998 | Shieh |
| 5,789,766 A | 8/1998 | Huang et al. |
| 5,812,105 A | 9/1998 | Van de Ven |
| 5,815,411 A | 9/1998 | Ellenby et al. |
| 5,818,404 A | 10/1998 | Lebby et al. |
| 5,827,753 A | 10/1998 | Huang et al. |
| 5,898,401 A | 4/1999 | Walls |
| 5,945,789 A | 8/1999 | Chou |
| 5,977,960 A | 11/1999 | Nally et al. |
| 5,982,299 A | 11/1999 | Shemwell |
| 5,990,506 A | 11/1999 | Fossum et al. |
| 6,011,493 A | 1/2000 | Bushell et al. |
| 6,046,689 A | 4/2000 | Newman |
| 6,100,921 A | 8/2000 | Rowley |
| 6,118,401 A | 9/2000 | Tognazzini |
| 6,127,668 A | 10/2000 | Baek |
| 6,130,636 A | 10/2000 | Severwright |
| 6,150,938 A | 11/2000 | Sower et al. |
| 6,178,650 B1 | 1/2001 | Thibodeaux |
| 6,211,808 B1 | 4/2001 | Rees |
| 6,222,457 B1 | 4/2001 | Mills et al. |
| 6,235,549 B1 | 5/2001 | Bawolek et al. |
| 6,246,320 B1 | 6/2001 | Monroe |
| 6,252,497 B1 | 6/2001 | Dupay et al. |
| 6,275,773 B1 | 8/2001 | Lemelson et al. |
| 6,278,382 B1 | 8/2001 | DeMarco et al. |
| 6,359,323 B1 | 3/2002 | Eom et al. |
| 6,366,212 B1 | 4/2002 | Lemp |
| 6,369,417 B1 | 4/2002 | Lee |
| 6,369,942 B1 | 4/2002 | Hedrick et al. |
| 6,379,992 B2 | 4/2002 | Jo |
| 6,386,572 B1 | 5/2002 | Cofer |
| 6,388,748 B1 | 5/2002 | Kokura |
| 6,429,420 B1 | 8/2002 | Babst et al. |
| 6,439,752 B1 | 8/2002 | Petrick |
| 6,486,798 B2 | 11/2002 | Rast |
| 6,486,913 B1 | 11/2002 | Afghahi et al. |
| 6,765,276 B2 | 7/2004 | Fasen et al. |
| 6,872,584 B2 | 3/2005 | Nakashiba |
| 6,909,381 B2 | 6/2005 | Kahn |
| 6,963,293 B1 | 11/2005 | Rast |
| 6,995,662 B2 | 2/2006 | Wortsmith |
| 7,129,979 B1 | 10/2006 | Lee |
| 7,269,493 B2 | 9/2007 | Uemura et al. |
| 7,292,209 B2 | 11/2007 | Rast |
| 7,983,836 B2 | 7/2011 | Breed |
| 8,264,377 B2 | 9/2012 | Griffith |
| 8,803,710 B2 | 8/2014 | Griffith |
| 8,867,025 B1* | 10/2014 | Smalls ............ G08G 5/04 356/28 |
| 9,389,491 B2* | 7/2016 | Clearman ............ G03B 17/561 |
| 10,013,888 B2 | 7/2018 | Griffith |
| 10,429,214 B2* | 10/2019 | Staton ............ G01S 7/4813 |
| 10,431,104 B2 | 10/2019 | Griffith |
| 11,682,313 B2* | 6/2023 | Griffith ............ G08G 5/045 701/3 |
| 2004/0147059 A1 | 7/2004 | Jeong et al. |
| 2005/0007257 A1 | 1/2005 | Rast |
| 2005/0090035 A1 | 4/2005 | Kim |
| 2005/0263839 A1 | 12/2005 | Suzuki |
| 2006/0011813 A1 | 1/2006 | Park et al. |
| 2006/0043261 A1 | 3/2006 | Matsuda et al. |
| 2006/0138500 A1 | 6/2006 | Kim |
| 2006/0157761 A1 | 7/2006 | Park et al. |
| 2006/0261342 A1 | 11/2006 | Wells |
| 2006/0287829 A1* | 12/2006 | Pashko-Paschenko ............ B60Q 9/005 340/436 |
| 2007/0023802 A1 | 2/2007 | Oh et al. |
| 2007/0090274 A1 | 4/2007 | Lee et al. |
| 2007/0187793 A1 | 8/2007 | Moon et al. |
| 2008/0062011 A1 | 3/2008 | Butler et al. |
| 2008/0083851 A1 | 4/2008 | Perry et al. |
| 2016/0163208 A1* | 6/2016 | Zhou ............ G06V 20/58 701/301 |

(56) References Cited

U.S. PATENT DOCUMENTS

2018/0035606 A1* 2/2018 Burdoucci ............ A01D 34/84
2021/0302541 A1* 9/2021 Fields ................... H05K 7/14

FOREIGN PATENT DOCUMENTS

CN   206179618 U  *  5/2017  ............ H01C 1/012
CN   207987860 U  *  10/2018
KR   102173314 B1 *  11/2000

OTHER PUBLICATIONS

Soltani, Mojdeh, et al. "An eco-friendly aircraft taxiing approach with collision and conflict avoidance." Transportation Research Part C: Emerging Technologies 121 (2020): 102872 . . . (Year: 2020).*
Wang, Xin-wei, et al. "Optimal control based coordinated taxiing path planning and tracking for multiple carrier aircraft on flight deck." Defence Technology 18.2 (2022): 238-248. (Year: 2022).*
Yu, W. U., et al. "Exploring mission planning method for a team of carrier aircraft launching." Chinese Journal of Aeronautics 32.5 (2019): 1256-1267. (Year: 2019).*
Xue, Junxiao, et al. "Obstacle Avoidance and Simulation of Carrier-Based Aircraft on the Deck of Aircraft Carrier." Journal of System Simulation 35.3 (2023): 592-603. (Year: 2023).*
PCT Written Opinion of the International Searching Authority for International Application No. PCT/US10/00621 mailed Oct. 27, 2010.
Office Action for U.S. Appl. No. 17/204,304 dated Sep. 15, 2022.
Office Action for U.S. Appl. No. 17/204,304 dated Jan. 20, 2023.

* cited by examiner

SENSOR ASSEMBLY FOR USE IN ASSOCIATION WITH AIRCRAFT COLLISION AVOIDANCE SYSTEM AND METHOD OF USING THE SAME

CROSS-REFERENCE TO RELATED APPLICATIONS

This application is a continuation of U.S. application Ser. No. 17/204,304, entitled "SENSOR ASSEMBLY FOR USE IN ASSOCIATION WITH AIRCRAFT COLLISION AVOIDANCE SYSTEM AND METHOD OF USING THE SAME" filed Mar. 17, 2021, now U.S. Pat. No. 11,682,313—which is hereby incorporated herein by reference in its entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to ground-based collision avoidance systems for aircraft, and, more particularly, to sensor assemblies for use in association with non-integrated, ground-based collision avoidance systems for aircraft.

The present invention further relates to methods for using sensor assemblies while aircraft are, for example, being moved into and/or out of a hanger and/or being repositioned on the ground.

2. Background Art

Collision avoidance systems for aircraft are becoming increasingly popular in today's society. These systems reduce hanger rash and/or damage to an aircraft while the aircraft is being transported, for example, via a tug on the ground. Generally, there are two types of ground-based collision avoidance systems for aircraft, namely: integrated collision avoidance systems and non-integrated collision avoidance systems.

Ground-based, integrated collision avoidance systems for aircraft are advantageous because they typically have all sensors and other functional components installed into portions (e.g., wing, fuselage, etcetera) of the aircraft during the original manufacturing process. However, ground-based, integrated collision avoidance systems are replete with drawbacks and/or complications, including, for example, they are limited to use in a single aircraft, they require certification by the Federal Aviation Administration (FAA), they are extraordinarily expensive to both install and repair, and they can ground the aircraft due to scheduled and/or unscheduled maintenance—just to name a few.

Ground-based, non-integrated collision avoidance systems for aircraft are advantageous because they are designed to be used on multiple aircraft at a single fixed-based operator (FBO), they do not require FAA certification, they are relatively inexpensive compared to ground-based, integrated collision avoidance systems, and they do not require aircraft grounding for scheduled and/or unscheduled maintenance (i.e., maintenance is completed independently of the aircraft). While ground-based, non-integrated collision avoidance systems have several benefits compared to ground-based, integrated collision avoidance systems, one material drawback is placement of portable sensors on some surfaces (e.g., horizontal stabilizer, elevator, etcetera) of large aircraft (e.g., Gulfstream G280, Gulfstream G500, Gulfstream G550, Gulfstream G650, Gulfstream G650ER, Gulfstream G700, Dassault Falcon 6X, Dassault Falcon 7X, Dassault Falcon 8X, etcetera). In particular, the tail section of large jets can range from approximately 25 feet to 35 feet above the ground, which is far outside the reach of a normal person. Furthermore, if one of the sensors inadvertently falls from, for example, the T-tail of a large jet, it likely will be damaged, compromised, and/or rendered otherwise non-operable. As such, there is a genuine demand for novel sensor assemblies used in ground-based, non-integrated collision avoidance systems that enable a user to quickly and easily releasably secure a portable sensor to remote areas of a large aircraft that are outside the reach of a normal person. There is also a genuine demand for novel sensor assemblies that are configured to remain functionally operable even after being inadvertently dropped from, for example, the T-tail of a large jet.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a sensor assembly for use in association with a non-integrated, ground-based collision avoidance system for an aircraft, comprising, consisting essentially of, and/or consisting of: (a) a sensor (e.g., a separation monitoring sensor); and (b) a frame sub-assembly, wherein the sensor is releasably securable to the frame sub-assembly.

In a preferred embodiment of the present invention, the sensor assembly enables a user to quickly and easily releasably secure the sensor to remote areas of a large aircraft that are outside the reach of a normal person.

In another preferred embodiment of the present invention, the sensor assembly is configured to have the sensor remain functionally operable even after being dropped from the T-tail of a large jet.

In yet another preferred embodiment of the present invention, the sensor is configured to monitor the distance between itself and another object.

In one embodiment of the present invention, the sensor monitors distance via ultrasonic radio frequency ranging from approximately 20 kHz to approximately 5 GHz.

In a preferred embodiment of the present invention, the sensor monitors distance via RADAR and/or LIDAR.

In another preferred embodiment of the present invention, the sensor comprises a primary and/or secondary electrochemical cell.

In yet another preferred embodiment of the present invention, the sensor is positioned within the frame sub-assembly.

In one aspect of the present invention, the frame sub-assembly is adapted to releasably receive a terminal end of an elongated shaft (e.g., a T-shaft, etcetera).

The present invention is also directed to a sensor assembly for use in association with a non-integrated, ground-based collision avoidance system for an aircraft, comprising, consisting essentially of, and/or consisting of: (a) a sensor; (b) a frame sub-assembly, wherein the sensor is releasably securable to the frame sub-assembly; (c) wherein the sensor assembly enables a user to quickly and easily releasably secure the sensor to remote areas of a large aircraft that are outside the reach of a normal person; and (d) wherein the sensor assembly is configured to have the sensor remain functionally operable even after being dropped from the T-tail of a large jet.

The present invention is further directed to a sensor assembly for use in association with a non-integrated, ground-based collision avoidance system for an aircraft, comprising, consisting essentially of, and/or consisting of: (a) a sensor; and (b) a frame sub-assembly, wherein frame sub-assembly comprises a top panel, a bottom panel, a front panel, an interior left-side panel, an exterior left-side panel, an interior right-side panel, an exterior right-side panel, an upper jaw panel, a lower jaw panel, and a T-bar stop panel.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
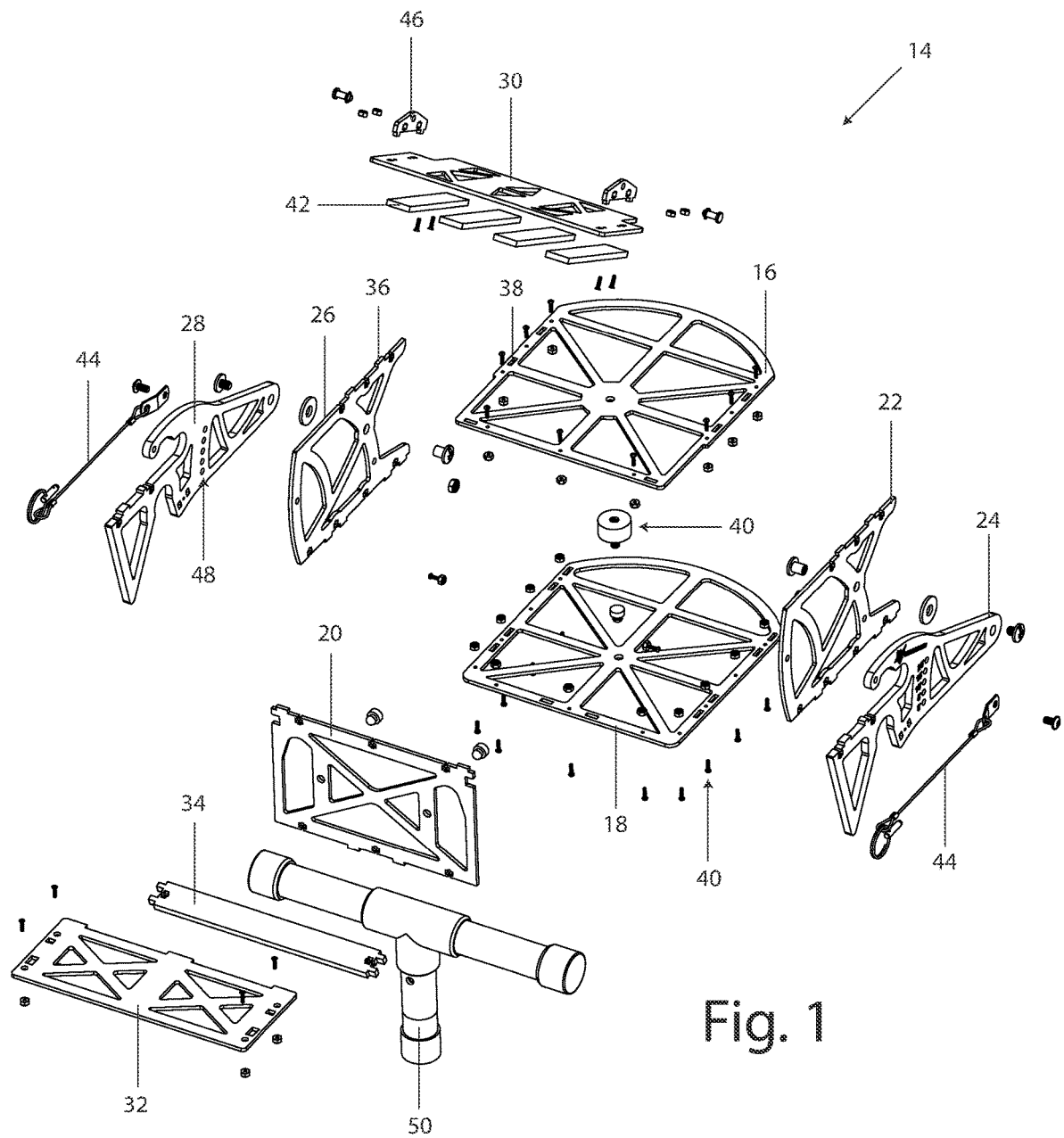
Figure 2:
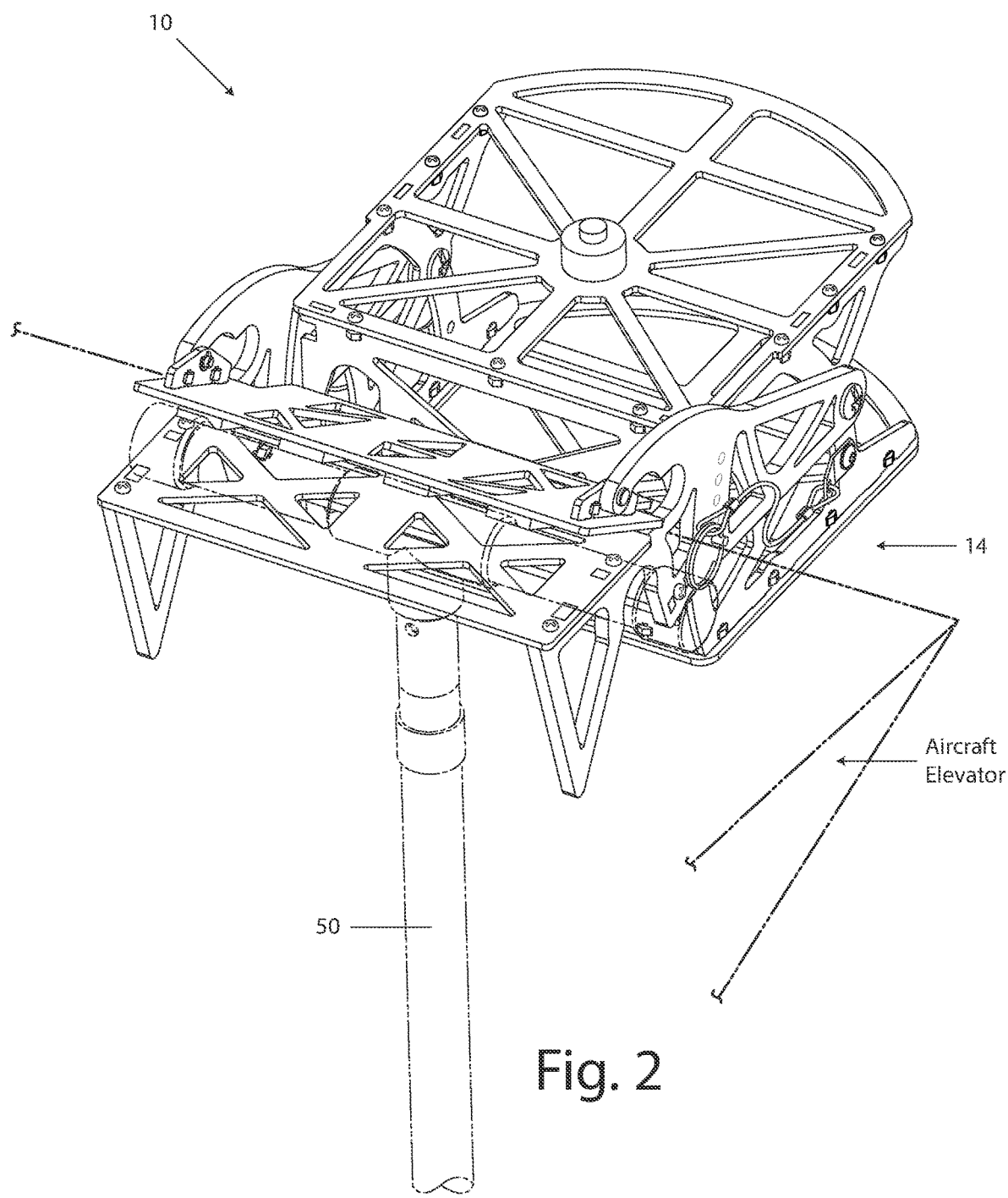
Figure 3:
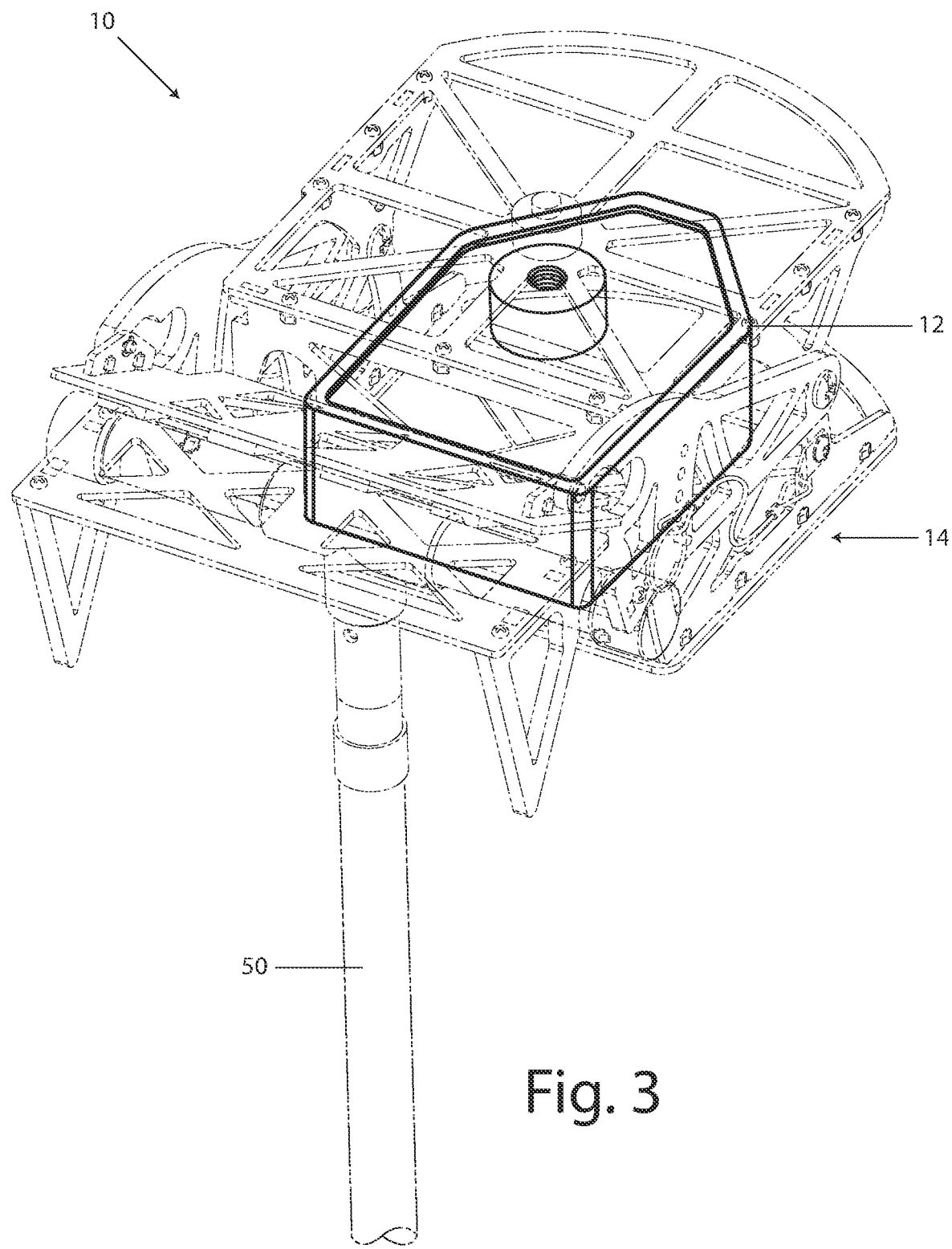
Figure 4:
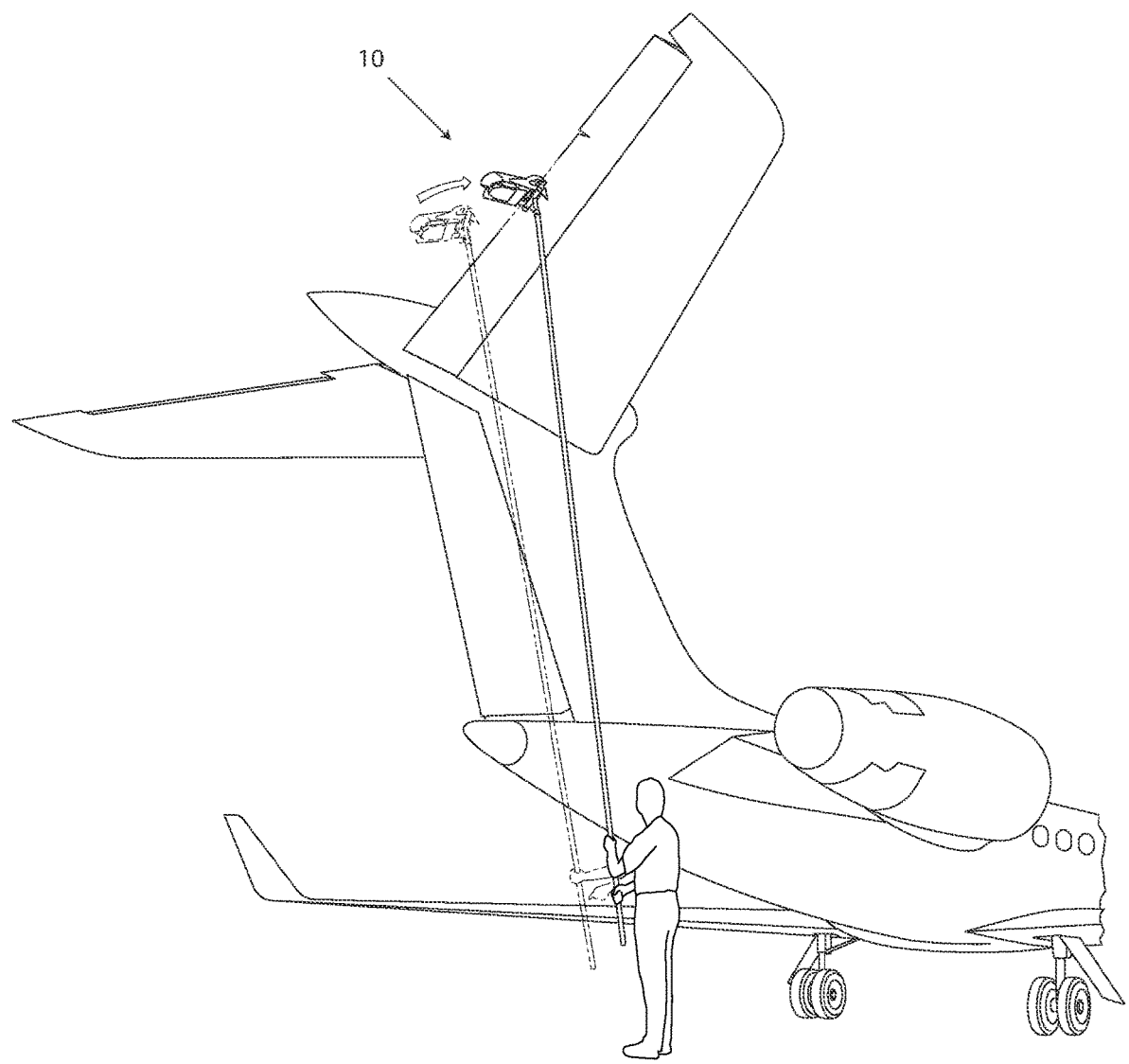

The invention will now be described with reference to the drawings wherein:

FIG. 1 of the drawings is a front, exploded perspective view of a sensor assembly in accordance with the present invention;

FIG. 2 of the drawings is a front perspective view of the sensor assembly of FIG. 1, showing among other things, the sensor assembly associated with the elevator of an aircraft;

FIG. 3 of the drawings is a front perspective view of the sensor assembly of FIG. 1, highlighting the sensor releasably positioned therein; and FIG. 4 of the drawings is a perspective view showing a user releasably securing the sensor assembly to the elevator of an aircraft.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

In accordance with the present invention, the sensor assemblies disclosed herein enable a user to quickly and easily releasably secure a portable sensor (e.g., a separation monitoring sensor) to remote areas of a large aircraft that are outside the reach of a normal person. The sensor assemblies of the present invention are also configured to remain functionally operable even after being inadvertently dropped from, for example, the T-tail of a large jet (i.e., 25 feet or more above the ground).

Referring now to the collective drawings (i.e., FIGS. 1-4), and to FIGS. 1-3 in particular, perspective views of a first embodiment of sensor assembly 10, preferably for use in association with a non-integrated, ground-based collision avoidance system for an aircraft, is shown which generally comprises sensor 12 and frame sub-assembly 14. Preferably, sensor 12 is releasably securable within frame sub-assembly 14.

Sensor 12 is preferably configured to monitor the distance between itself and another object to prevent an aircraft that is being moved from colliding with, for example, another aircraft and/or object (e.g., wall, hanger door, ground equipment, auxiliary power unit, etcetera). Sensor 12 is preferably releasably securable to the tail, horizontal stabilizer and/or elevator of an aircraft and preferably works in cooperation with a plurality of other portable sensors positioned on other parts of the aircraft (e.g., fuselage, wing, etcetera).

By way of non-limiting examples, sensor 12 preferably monitors distance via ultrasonic radio frequency ranging from approximately 20 kHz to approximately 5 GHz. It will be understood that sensor 12 may also monitor distance via RADAR and/or LIDAR.

Preferably, sensor 12 comprises a primary and/or secondary electrochemical cell, and, during normal operation, is positioned within frame sub-assembly 14 so that it can be releasably secured to an aircraft, and protect sensitive and/or fragile components of the sensor from being damaged if the sensor assembly inadvertently falls off of the aircraft.

Non-limiting examples of suitable sensors 12 (e.g., a separation monitoring sensors) for use in accordance with the present invention include those disclosed in U.S. Pat. No. 8,264,377 entitled "Aircraft Collision Avoidance System," U.S. Pat. No. 8,803,710 entitled "Aircraft Collision Avoidance System," U.S. Pat. No. 10,013,888 entitled "Aircraft Collision Avoidance System," and U.S. Pat. No. 10,431,104 entitled "Aircraft Collision Avoidance System," all of which are hereby incorporated herein by reference in their entirety—including all references cited therein.

Sensor 12 may additionally and/or alternatively comprise an image sensor for providing a user with an image (e.g., a photo, a video). Examples of suitable image sensors include video camera tubes, semiconductor charge-coupled devices (CCD), active pixel sensor in complementary metal-oxide-semiconductors (CMOS), N-type metal-oxide-semiconductors (NMOS, Live MOS), and back-side illuminated complementary metal-oxide-semiconductors (BSI-CMOS).

It will be understood that the above-identified image sensors are commercially available from a plurality of sources, including Agilent, Aptina, Canesta, Canon, Caeleste, CMOSIS, Dalsa, Eastman Kodak, ESS Technology, Fujifilm, MagnaChip, Matsushita, MAZeT GmbH, Mitsubishi, Nikon OmniVision Technologies, ON Semiconductor, Cypress Semiconductor, PixArt Imaging, Pixim, Samsung, Sharp, Sony, STMicroelectronics, Toshiba, TowerJazz, Town Line Technologies, TransChip, Trusight and Trusense Imaging—just to name a few suppliers.

Additional examples of suitable image sensors for use in accordance with the present invention include, for example, those disclosed in U.S. Pat. No. 6,359,323 B1 entitled "Color Image Sensor And Method For Fabricating The Same," U.S. Patent Application Publication No. 2006/0043261 A1 entitled "Solid State Image Pickup Device And Image Pickup System Comprising It," U.S. Pat. No. 7,129,979 B1 entitled "Image Sensor Pixel For Global Electronic Shuttering," U.S. Patent Application Publication No. 2004/0147059 A1 entitled "Method For Manufacturing CMOS Image Sensor Having Microlens Therein With High Photosensitivity," U.S. Pat. No. 5,990,506 A entitled "Active Pixel Sensors With Substantially Planarized Color Filtering Elements," U.S. Pat. No. 6,235,549 B1 entitled "Method And Apparatus For Employing A Light Shield To Modulate Pixel Color Responsivity," U.S. Pat. No. 6,765,276 B2 entitled "Bottom Antireflection Coating Color Filter Process For Fabricating Solid State Image Sensors," U.S. Pat. No. 6,486,913 B1 entitled "Pixel Array With Shared Reset Circuitry," U.S. Pat. No. 6,872,584 B2 entitled "Solid State Image Sensor And Method For Fabricating The Same," U.S. Patent Application Publication No. 2006/0011813 A1 entitled "Image Sensor Having A Passivation Layer Exposing At Least A Main Pixel Array Region And Methods Of Fabricating The Same," U.S. Patent Application Publication No. 2007/0187793 A1 entitled "Filter, Color Filter Array, Method Of Manufacturing The Color Filter Array, And Image Sensor," U.S. Pat. No. 6,379,992 B2 entitled "Method For Fabricating An Image Sensor," U.S. Patent Application Publication No. 2006/0138500 A1 entitled "CMOS Image Sensor And Method For Fabricating The Same," U.S. Patent Application Publication No. 2005/0263839 A1 entitled "Photoelectric Converting Film Stack Type Solid-State Image Pickup Device, And Method Of Producing The Same," U.S. Patent Application Publication No. 2007/0090274 A1 entitled "Image Sensors Including Active Pixel Sensor Arrays," U.S. Patent Application Publication No. 2006/0157761 A1 entitled "Image Sensor With Self-Boosting And Methods Of Operating And Fabricating The Same," U.S. Pat. No. 6,369,417 B1 entitled "CMOS Image Sensor And Method For Fabricating The Same," U.S. Pat. No. 6,127,668 A entitled "Solid State Image Pickup Device And Method For Manufacturing The Same," U.S. Patent Application Publication No. 2007/0023802 A1 entitled "CMOS Image Sensor And Method Of Fabricating The Same," U.S. Patent Application Publication No. 2005/0090035 A1 entitled "Method For Fabricating CMOS Image Sensor Protecting Low Temperature Oxide Delamination," and U.S. Patent Application Publication No. 2006/0261342 A1 entitled "Imaging Device Having A Pixel Cell With A Transparent Conductive Interconnect Line And The Method Of Making The Pixel Cell"—all of which are hereby incorporated herein by reference in their entirety, including all references cited therein.

Referring once again to FIGS. 1-3, frame sub-assembly 14 generally comprises top panel 16, bottom panel 18, front panel 20, interior left-side panel 22, exterior left-side panel 24, interior right-side panel 26, exterior right-side panel 28, upper jaw panel 30, lower jaw panel 32, and T-bar stop panel 34. The above-identified components of frame sub-assembly 14 include a plurality of tabs 36 and slots 38, which in cooperation with fasteners/securing members 40 (e.g., nut, bolt, screw, washer, etcetera) are used to securely assemble frame sub-assembly 14.

Frame sub-assembly 14 may include other adjunct components, such as gripping/cushioning members 42, quick release pins with lanyards 44, connectors 46.

Upper and lower jaw panels 30 and 32, respectively form a jaw that engages the aircraft during normal use. The jaw is adjustable via pins placed in apertures 48 of exterior left-side panel 24 and exterior right-side panel 28. The exterior side panels also include a recessed region for frictionally engaging the T-portion of pole 50.

It will be understood that the components of frame sub-assembly 14, when assembled, collectively form a crumple zone that provides sufficient protection for sensor 12 in the event that sensor assembly 10 falls from the aircraft during placement and/or use.

In one embodiment of the present invention, the components of frame sub-assembly 14 are fabricated from a metal, a metal alloy, a natural resin, a synthetic resin, a plastic, a composite, wood, and/or combinations thereof.

Referring now to FIG. 4, and in operation a user first secures the T-portion of a pole to sensor assembly 10. Next the user frictionally engages the jaw portion of the sensor assembly to the upper and lower surfaces of, for example, the elevator of an aircraft. Once engaged and secured to the aircraft, the aircraft is typically moved using the non-integrated, ground-based collision avoidance system. After the aircraft has been properly moved and/or repositioned, the user removes sensor assembly 10 from the aircraft. Finally, the T-portion of the pole is disengaged from the sensor assembly so that the components can be stored for future use.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A sensor assembly, comprising:
   a sensor;
   a frame sub-assembly for use in association with a non-integrated, ground-based collision avoidance system for an aircraft, wherein the sensor is releasably securable to the frame sub-assembly, wherein the frame sub-assembly includes an upper jaw panel, a lower jaw panel, an exterior left-side panel, an exterior right-side panel, wherein the upper jaw panel is pivotably mounted to both the exterior left-side panel and the exterior right-side panel, wherein the lower jaw panel is positioned below the upper jaw panel and non-pivotably mounted to both the exterior left-side panel and the exterior right-side panel to, in turn, form a jaw that engages an aircraft during normal use;
   wherein the sensor assembly enables a user to quickly and easily releasably secure the sensor to remote areas of a large aircraft that are outside the reach of a normal person; and
   wherein the sensor assembly is configured to have the sensor remain functionally operable even after being dropped from the T-tail of a large jet.

2. A sensor, comprising:
   a sensor; and
   a frame sub-assembly for use in association with a non-integrated, ground-based collision avoidance system for an aircraft, wherein frame sub-assembly comprises a top panel, a bottom panel, a front panel, an interior left-side panel, an exterior left-side panel, an interior right-side panel, an exterior right-side panel, an upper jaw panel, a lower jaw panel, and a T-bar stop panel, wherein the upper jaw panel is pivotably mounted to both the exterior left-side panel and the exterior right-side panel, wherein the lower jaw panel is positioned below the upper jaw panel and non-pivotably mounted to both the exterior left-side panel and the exterior right-side panel to, in turn, form a jaw that engages an aircraft during normal use.

3. A sensor assembly, comprising:
   a sensor; and
   a frame sub-assembly for use in association with a non-integrated, ground-based collision avoidance system for an aircraft, wherein the sensor is releasably securable to the frame sub-assembly, wherein the frame sub-assembly includes an upper jaw panel, a lower jaw panel, an exterior left-side panel, an exterior right-side panel, wherein the upper jaw panel is pivotably mounted to both the exterior left-side panel and the exterior right-side panel, wherein the lower jaw panel is positioned below the upper jaw panel and non-pivotably mounted to both the exterior left-side panel and the exterior right-side panel to, in turn, form a jaw that engages an aircraft during normal use.

4. The sensor assembly according to claim 3, wherein the sensor assembly enables a user to quickly and easily releasably secure the sensor to remote areas of a large aircraft that are outside the reach of a normal person.

5. The sensor assembly according to claim 4, wherein the sensor monitors distance via ultrasonic radio frequency ranging from approximately 20 KHz to approximately 5 GHz.

6. The sensor assembly according to claim 4, wherein the sensor monitors distance via RADAR.

7. The sensor assembly according to claim 4, wherein the sensor monitors distance via LIDAR.

8. The sensor assembly according to claim 3, wherein the sensor assembly is configured to have the sensor assembly remain functionally operable even after being dropped from the T-tail of a large jet.

9. The sensor assembly according to claim 3, wherein the sensor is configured to monitor the distance between itself and another object.

10. The sensor assembly according to claim 3, wherein the sensor comprises a primary and/or secondary electrochemical cell.

11. The sensor assembly according to claim 3, wherein the sensor is positioned within the frame sub-assembly.

12. The sensor assembly according to claim 3, wherein the frame sub-assembly is adapted to releasably receive a terminal end of an elongated shaft.

13. The sensor assembly according to claim 12, wherein the terminal end of the elongated shaft comprises a T-shaft.

* * * * *